US012594982B1

(12) United States Patent

Haubenstricker et al.

(10) Patent No.: US 12,594,982 B1

(45) Date of Patent: Apr. 7, 2026

(54) TELESCOPE FORCE OFFSETTING MECHANISM FOR A STEERING COLUMN ASSEMBLY

(71) Applicant: Steering Solutions IP Holding Corporation, Saginaw, MI (US)

(72) Inventors: Kevin J. Haubenstricker, Frankenmuth, MI (US); Brian J. Magnus, Frankenmuth, MI (US); Travis L. Palmer, Frankenmuth, MI (US); John S. Beam, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 19/094,307

(22) Filed: Mar. 28, 2025

(51) Int. Cl.
*B62D 1/185* (2006.01)

(52) U.S. Cl.
CPC .................................... *B62D 1/185* (2013.01)

(58) Field of Classification Search
CPC ......... B62D 1/181; B62D 1/185; B62D 1/187
See application file for complete search history.

(56) References Cited

U.S. PATENT DOCUMENTS

| | | | | | |
|---|---|---|---|---|---|
| 7,219,926 | B2 * | 5/2007 | Ikeda | ..................... | B62D 1/187 280/775 |
| 7,354,068 | B2 * | 4/2008 | Ishida | .................... | B62D 1/184 280/775 |
| 8,047,096 | B2 * | 11/2011 | Ridgway | ................ | B62D 1/184 280/775 |
| 8,550,497 | B2 * | 10/2013 | Takezawa | .............. | B62D 1/185 280/775 |
| 8,826,769 | B2 * | 9/2014 | Takezawa | .............. | B62D 1/189 280/778 |
| 8,943,923 | B2 * | 2/2015 | Kakishita | ............... | B62D 1/187 280/775 |
| 8,955,881 | B2 * | 2/2015 | Tinnin | ................... | B62D 1/187 280/775 |
| 9,238,476 | B2 * | 1/2016 | Oishi | ..................... | B62D 1/187 |
| 9,446,783 | B2 * | 9/2016 | Yamamoto | ............. | B62D 1/185 |
| 9,586,611 | B2 * | 3/2017 | Sakuda | .................. | B62D 1/184 |
| 9,783,221 | B2 * | 10/2017 | Sakuda | .................. | B62D 1/195 |

(Continued)

FOREIGN PATENT DOCUMENTS

JP                    2016165933 A    *    9/2016

*Primary Examiner* — Laura Freedman

(74) *Attorney, Agent, or Firm* — Dickinson Wright PLLC

(57)                    ABSTRACT

A steering column assembly comprising an upper jacket, a lower jacket, a hand wheel actuator disposed between an end of the upper jacket and a steering input device, and an offsetting mechanism. The upper jacket is telescopingly adjustable within the lower jacket between a retracted column position and an extended column position. The offsetting mechanism comprises a spring extending from a first end to a second end and a compensation component. The spring is configured to provide a biasing force at the second end of the spring that reduces gravitational effects on the steering column assembly during the telescopic adjustment. The compensation component comprises a sloped surface disposed within an interior of the upper jacket. The sloped surface is non-parallel with a longitudinal axis of the upper jacket and the second end of the spring operably slides on the sloped surface of the compensation component during the telescopic adjustment.

13 Claims, 4 Drawing Sheets

(56) References Cited

U.S. PATENT DOCUMENTS

| | | | | |
|---|---|---|---|---|
| 10,040,473 | B2 * | 8/2018 | Uesaka | ................... B62D 1/185 |
| 10,059,363 | B2 * | 8/2018 | Sugishita | ............... B62D 1/184 |
| 10,160,475 | B2 * | 12/2018 | Uesaka | .................... B62D 1/19 |
| 11,097,767 | B2 * | 8/2021 | Nakazato | ............... B62D 1/187 |
| 11,945,495 | B2 * | 4/2024 | Ponikiewski | .......... B62D 1/187 |
| 11,958,526 | B2 * | 4/2024 | Caverly | ................. B62D 1/185 |
| 2025/0222973 | A1 * | 7/2025 | Hartman | ................ B62D 1/181 |
| 2025/0276731 | A1 * | 9/2025 | Annequin-Digond | ........................ B62D 1/185 |

* cited by examiner

TELESCOPE FORCE OFFSETTING MECHANISM FOR A STEERING COLUMN ASSEMBLY

TECHNICAL FIELD

The following description relates to vehicle steering systems and, more particularly, a mechanism to offset telescope force of a steering column assembly.

BACKGROUND

A vehicle, such as a car, truck, sport utility vehicle, crossover, mini-van, marine craft, aircraft, all-terrain vehicle, recreational vehicle, or other suitable vehicles, include various steering systems to carry out steering maneuvers. These steering systems typically include a steering column assembly for translating steering input to an output that interacts with a steering linkage to ultimately cause the vehicle wheels to turn. The steering column assembly must balance durability, safety, and ease of use while accommodating various design constraints. A design factor in steering column assemblies is the telescope force, which is the force required to adjust the axial position of the column, particularly in adjustable and collapsible steering columns. The force required to telescope a steering column assembly is typically symmetric in each direction when the column is horizontal.

Telescope effort is influenced by several parameters, including the angle of the column and the mass distribution of components mounted to the column. As the column angle increases (i.e., as the steering column assembly becomes more inclined away from a horizontal orientation to position the steering wheel in a convenient location for grasping by a driver), gravitational and inertial forces contribute more significantly to the resistance encountered during telescoping "out" movement. When telescoping "out" (i.e., toward the driver), a vertical component of force is higher than when the column is oriented closer to horizontally. Similarly, when mass is concentrated higher (i.e., closer to the driver) in the steering column assembly, the increased moment amplifies resistance, making adjustment more difficult for the user.

These factors become particularly relevant in vehicles with significant mass present near the driver, steeply inclined steering column assemblies, or advanced steering assist mechanisms, where user experience and ergonomic considerations are important. The aforementioned issues introduce challenges for compliance with OEM requirements for maximum telescope effort and telescope effort consistency. Therefore, there is a need for improved steering column assembly designs that mitigate these effects to maintain smooth and efficient telescopic adjustment in both axial telescoping directions, while accommodating modern vehicle architectures.

SUMMARY OF THE DISCLOSURE

According to one aspect of the disclosure, a steering column assembly includes an upper jacket, a lower jacket, a hand wheel actuator disposed between an end of the upper jacket and a steering input device, and an offsetting mechanism. The upper jacket is telescopingly adjustable within the lower jacket between a retracted column position and an extended column position. The offsetting mechanism comprises a spring extending from a first end to a second end and a compensation component. The spring is configured to provide a biasing force at the second end of the spring that reduces gravitational effects on the steering column assembly during the telescopic adjustment. The compensation component comprises a sloped surface disposed within an interior of the upper jacket. The sloped surface is non-parallel with a longitudinal axis of the upper jacket and the second end of the spring operably slides on the sloped surface of the compensation component during the telescopic adjustment.

According to another aspect of the disclosure, the biasing force is larger in the retracted column position than in the extended column position.

According to another aspect of the disclosure, the sloped surface of the compensation component is integrally formed with or operatively coupled to the upper jacket.

According to another aspect of the disclosure, the sloped surface is angled at a predetermined angle from the upper jacket. The predetermined angle is based on an angle of the upper jacket in relation to a horizontal plane and weight of the steering column assembly.

According to another aspect of the disclosure, the spring is a rake spring.

According to another aspect of the disclosure, the steering column assembly further comprising an adaptor operatively coupled to the hand wheel actuator and the adaptor is disposed between the hand wheel actuator and the upper jacket.

According to another aspect of the disclosure, the compensating component is integrally formed with the adaptor or operatively coupled to the adaptor.

According to another aspect of the disclosure, the sloped surface comprises two or more portions and each portion of the sloped surface has a different predetermined angle from the upper jacket.

According to another aspect of the disclosure, at least a portion of the sloped surface is non-planar.

According to another aspect of the disclosure, an offsetting mechanism for a steering column assembly includes a spring extending from a first end to a second end and at least partially disposed within an interior region of a jacket of the steering column assembly. The offsetting mechanism also includes a compensation component, wherein the compensation component comprises a sloped surface disposed within the steering column assembly, wherein the second end of the spring operably slides on the sloped surface of the compensation component during a telescopic adjustment, wherein the spring is configured to provide a biasing force at the second end of the spring that reduces gravitational effects on the steering column assembly during the telescopic adjustment.

According to another aspect of the disclosure, a steering column assembly includes an upper jacket. The steering column assembly also includes a lower jacket, wherein the upper jacket is telescopingly adjustable within the lower jacket between a retracted column position and an extended column position. The steering column assembly further includes a hand wheel actuator disposed between an end of the upper jacket and a steering input device. The steering column assembly further includes an offsetting mechanism. The offsetting mechanism includes a spring extending from a first end to a second end. The offsetting mechanism also includes a compensation component, wherein the compensation component comprises a sloped surface that is non-parallel with a longitudinal axis of the upper jacket, wherein the second end of the spring operably slides on the sloped surface of the compensation component during the telescopic adjustment, wherein the spring is configured to provide a biasing force at the second end of the spring that reduces gravitational effects on the steering column assembly during the telescopic adjustment.

These and other aspects of the present disclosure are disclosed in the following detailed description of the embodiments, the appended claims, and the accompanying figures.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

DETAILED DESCRIPTION OF PREFERRED EMBODIMENTS

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
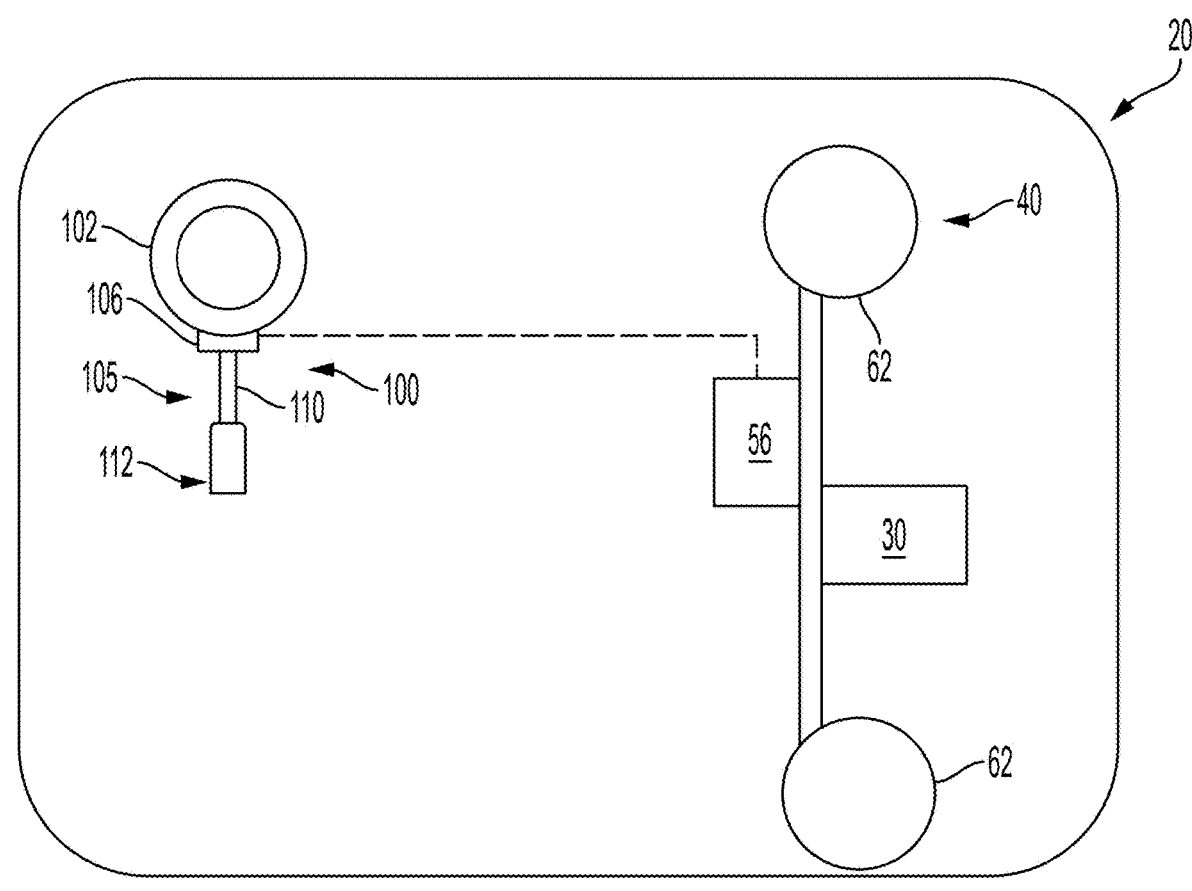
FIG. 1 schematically illustrates a vehicle steering system.

Referring initially to FIG. 1, a vehicle 20 is generally illustrated according to the principles of the present disclosure. The vehicle 20 may be any vehicle, such as a car, a truck, a sport utility vehicle, a mini-van, a crossover, any other passenger vehicle, any commercial vehicle, or any other suitable vehicle. While the vehicle 20 may be a passenger vehicle having wheels and for use on roads, the principles of the present disclosure may apply to other vehicles, such as planes, tractors, boats, or other suitable vehicles. The vehicle 20 may include a propulsion system 30, such as an internal combustion system, an electric system, or combinations thereof.

The vehicle 20 includes a steering system 40. The steering system 40 may be configured as a driver interface steering system, an autonomous driving system, or a system that allows for both driver interface and autonomous steering. The steering system includes a steering input device 102, such as a steering wheel, wherein a driver may manually provide a steering input by turning the steering wheel. A steering column assembly 100 includes a steering column 105 that extends along an axis. A hand wheel actuator ("HWA") 106 (which may also be referred to as an "emulator") is provided in the steer-by-wire system and is used to provide feedback and assistance to the steering input device 102 and to receive manual driver inputs for steering control.

The steering column 105 includes one or more portions, for example, an upper jacket 110 and a lower jacket 112. While two jackets are illustrated and described, it is to be appreciated that a single jacket or three or more jackets may be provided in some embodiments. Regardless of the number of jackets, the jackets may be axially and or height adjustable to be moveable over a range of positions to meet user preferences for positioning of the steering input device 102.

A road wheel actuator ("RWA") 56 is in operative communication with the hand wheel actuator 106. The road wheel actuator 56 actuates lateral maneuvers of the vehicle in response to inputs received from the hand wheel actuator 106. Each of the hand wheel actuator 106 and the road wheel actuator 56 may include a respective processor and controller or a single processor may be in communication with a respective controller of each of the hand wheel actuator 106 and the road wheel actuator 56. The road wheel actuator 56 is part of a system which includes an output that drives a rack, ball screw or any other cross-car oriented component that is operatively coupled to the road wheels 62.

Historically, a continuous mechanical connection spanning multiple components was utilized to connect the steering wheel 102 to the vehicle road wheels 62. However, steer-by-wire systems have eliminated the need for an uninterrupted mechanical connection between the steering wheel 102 and the vehicle road wheels 62. For example, a steering shaft which couples to the steering wheel and one or more additional shafts (e.g., intermediate shaft) is no longer needed in some systems. Advancements such as those outlined above present new opportunities and challenges in steer-by-wire systems. For example, certain components may be moved away from traditional locations to new locations within the system.

Figure 2:
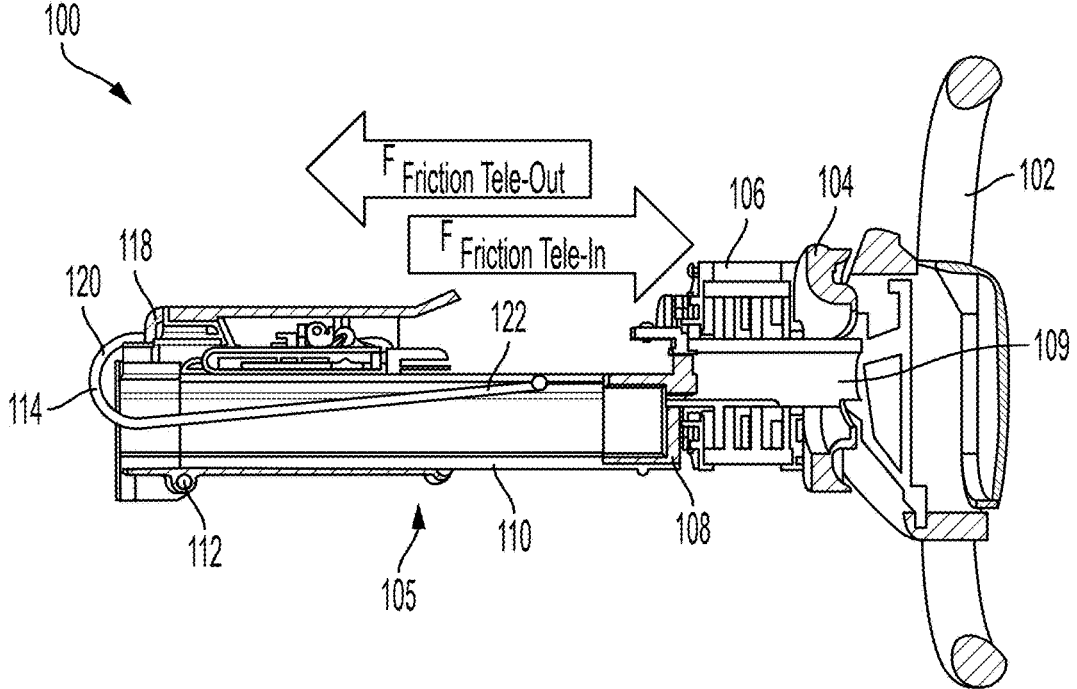
FIG. 2 is a side, cross sectional view of a steering column assembly of a steering system in a substantially horizontal orientation.

Referring to FIG. 2, the steering column assembly 100 is illustrated in more detail. The steering column assembly includes the steering input device 102, the hand wheel actuator 106, an adaptor 108, the upper jacket 110, the lower jacket 112, a spring 114, a column mounting bracket 118, and a compensating component 116 (depicted in FIGS. 4-8). The steering column assembly 100 is configured to allow for telescopic adjustments of the upper jacket 110 relative to the lower jacket 112 to accommodate driver preferences while maintaining structural integrity and ergonomic performance. The steering input device 102 is operatively coupled to a spindle 109 which resides within the hand wheel actuator 106 and is mounted to an end of the steering column assembly 100. The steering input device 102 is rotated in response to driver inputs and actuation by the hand wheel actuator 106. The steering input device 102 serves as the primary interface for the user to control direction of the vehicle. The steering input device 102 may be a steering wheel where a driver may mechanically provide a steering input by turning the steering wheel. The hand wheel actuator 106 is located between the steering input device 102 and the adaptor 108. The motor 104 is electrically connected to a controller, which receives the steering input from the steering input device 102 to initiate movement. The controller may regulate the operation, speed, torque, and direction of the motor 104.

The adaptor 108 is connected between the hand wheel actuator 106 and the upper jacket 110 to provide a structural connection between the jackets 110, 112 and the steering input device 102. The upper jacket 110 and the lower jacket 112 are permitted to move axially with respect to one another to allow the user to adjust the position of the steering input device 102 and during an impact event for safety purposes. The relative axial movement is described herein as being telescoping, wherein the upper jacket 110 telescopes within the lower jacket 112 over a range of axial positions from an extended column position to a retracted column position. The upper jacket 110 supports the steering input device 102 and the motor 104, allowing for controlled extension and retraction between the extended column position and the retracted column position. The interface between the upper jacket 110 and the lower jacket 112 incorporates low-friction surfaces or bearing elements to reduce resistance during adjustment. The lower jacket 112 is fixed to the vehicle, providing a stable base for column movement.

Figure 3:
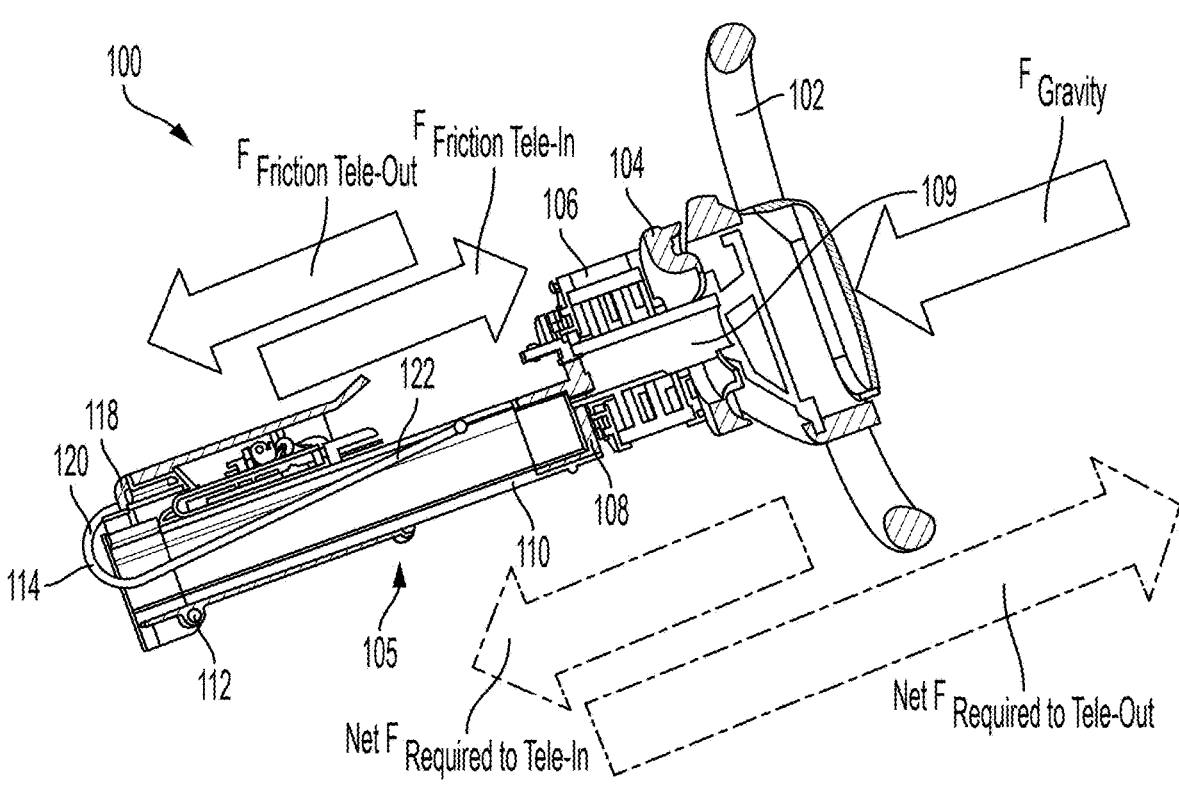
FIG. 3 is a force diagram of the steering column assembly of FIG. 2 when the steering column assembly is in an inclined position.

As shown in FIG. 2, the force from friction to telescope in (to the retracted column position) and telescope out (to the extended column position) are similar when the steering column assembly 100 is horizontally oriented. As shown in FIG. 3, the force required to telescope in is lower than the force required to telescope out because the steering column assembly 100 is angled and a force of gravity is acting on the steering wheel assembly 100. As the angle of the steering column assembly 100 increases, i.e., as the steering column assembly 100 becomes more inclined toward the driver, and the mass increases in the end of the steering column assembly 100 proximate to the steering input device 102, the force required to telescope in decreases and the force required to telescope out increases. Placement of the hand wheel actuator 106 near the "top" of the steering column assembly 100, such as adjacent to the steering input device 102, exacerbates the disparity between the telescope effort force required for telescope in vs. telescope out movement.

Figure 4:
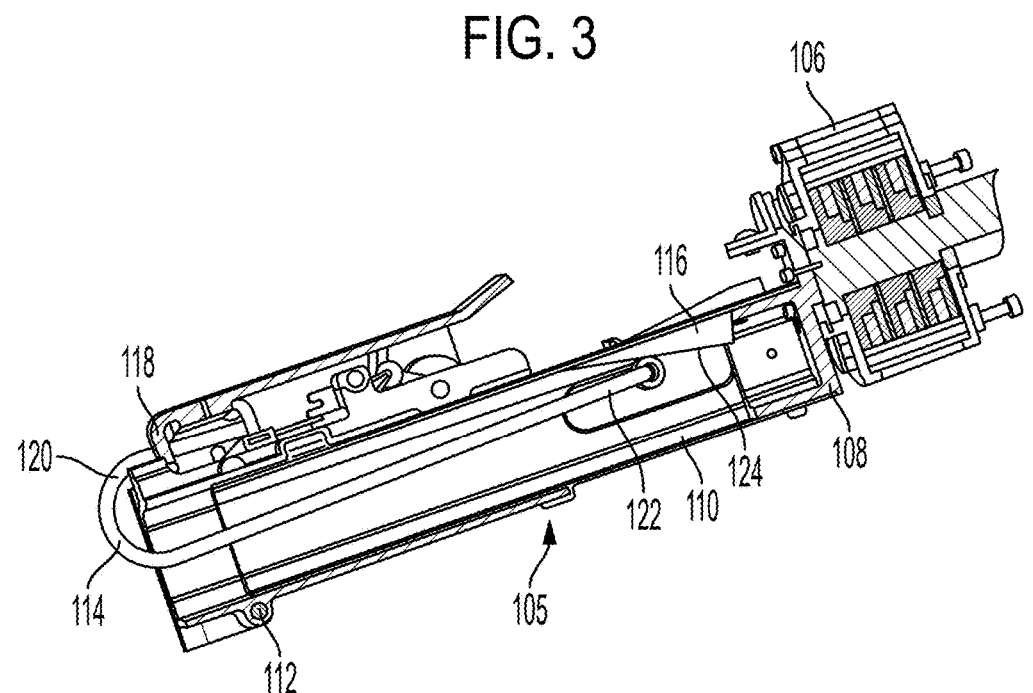
FIG. 4 is a cross sectional view of the steering column assembly with an offsetting mechanism.

Referring to FIG. 4, the offsetting mechanism disclosed herein includes the spring 114 and a compensating component 116. The compensating component 116 may be a component which is separately formed from the adaptor 108 and the upper jacket 110, and operatively coupled to the adaptor 108 and/or the upper jacket 110. Alternatively, the compensating component 116 may be integrally formed with the adaptor 108 or the upper jacket 110.

The compensating component 116 has at least a portion thereof which is disposed within an interior region defined by the upper jacket 110. More specifically, a sloped surface 124 of the compensating component 116 is located within the interior region of the upper jacket 110. The sloped surface 124 is referenced as "sloped" herein due to its angular orientation relative to a longitudinal axis of the upper jacket 110. In particular, the sloped surface 124 is not parallel to the longitudinal axis of the upper jacket 110. An angle, (Ø2) (depicted in FIG. 6), between the sloped surface 124 and the longitudinal axis of the upper jacket 110 is provided. The extent of the angle (02) based on the sloped surface 124 is dependent on the spring force necessary to offset the force of gravity, which will be described herein.

Figure 5:
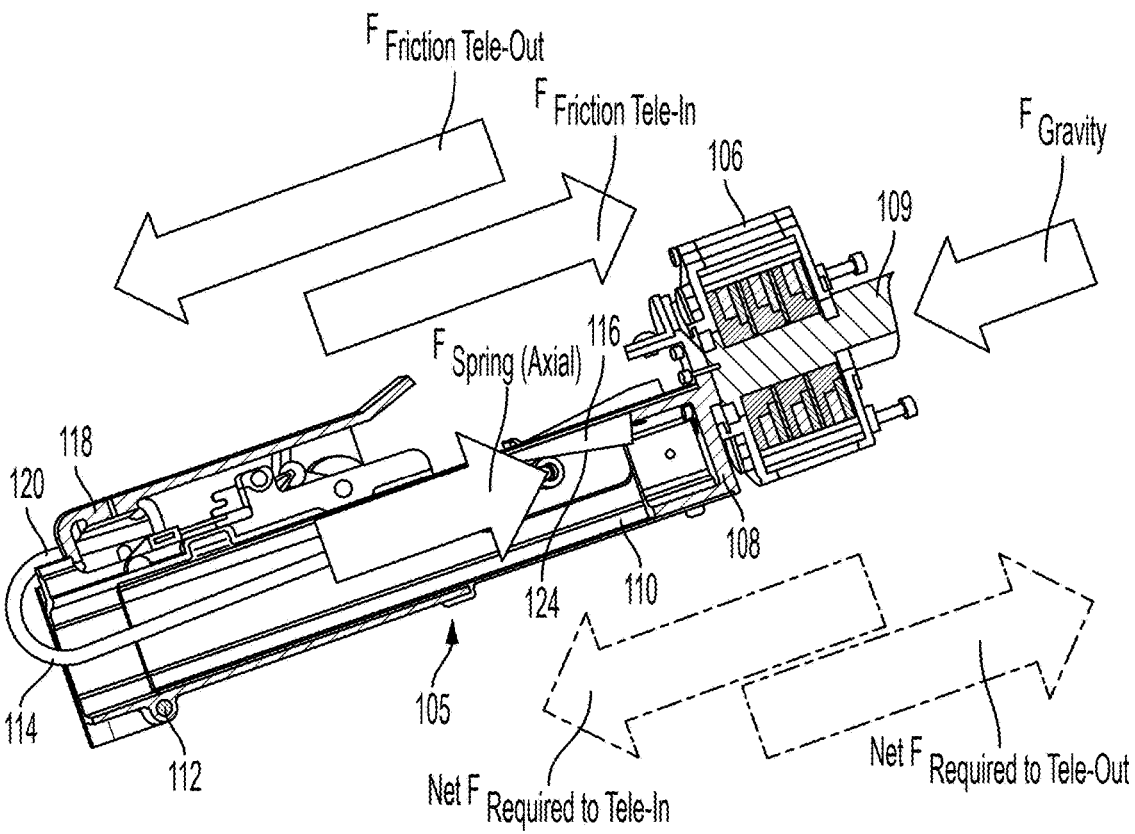
FIG. 5 is a force diagram of the steering column assembly with the offsetting mechanism.

In this embodiment, the spring 114 is a rake spring disposed within the interior region of the upper jacket 110. The spring 114 has a first end 120 and a second end 122. The first end 120 of the spring 114 is attached to the column mounting bracket 118, which is attached to a vehicle structure to mount the steering column assembly 100 within a vehicle. The second end 122 of the spring 114 slides on the sloped surface 124 when the upper jacket 110 telescopes in and telescopes out. The spring 114 is configured to assist with telescopic adjustment by providing a controlled biasing force (spring force) that reduces the force of gravity when telescoping the upper jacket 110 relative to the lower jacket 112. As the upper jacket 110 is telescoped in, the second end 122 of the spring 114 slides on the sloped surface 124 toward the adaptor 108. As the second end 122 of the spring 114 slides on the sloped surface 124, the spring 114 proximate to the first end 120 bends which creates more spring force at the second end 122 of the spring 114. The closer the second end 122 of the spring 114 slides toward the adaptor 108, the more the spring 114 bends proximate to the first end 120. The more the spring 114 bends, the more spring force created at the second end 122 of the spring 114. Therefore, the spring force increases as the upper jacket 110 is telescoped from the extended column position to the retracted column position. The spring force from the spring 114 in combination with the offsetting mechanism 116 reduces (offsets) the force of gravity as shown in FIG. 5.

Figure 6:
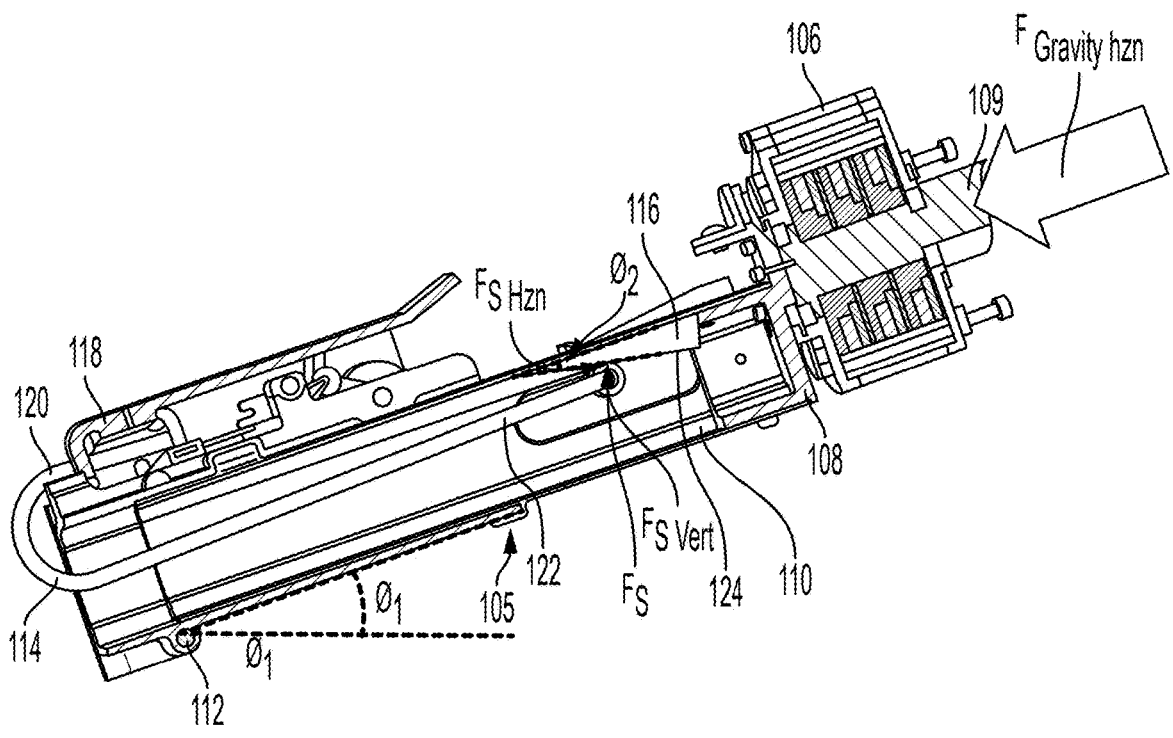
FIG. 6 is a side, cross-sectional view of the offsetting mechanism with a spring.

As shown in FIG. 6 and expressed in the below equation, the spring force of the spring 114 and the angle (Ø₂) are influenced by the weight of the components from the upper jacket 110 to the steering input device 102 and an angle (Ø₁) of the steering column assembly 100. This relationship is mathematically expressed as:

$$W_{Upper\ Column} \times \sin(\emptyset_1) = F_s \times \sin(\emptyset_2) \times \cos(\emptyset_2)$$

where $W_{Upper\ Column}$ is the weight of the components from the upper jacket 110 to the steering input device 102, $\emptyset_1$ is the angle of the steering column assembly 100 relative to horizontal, $\emptyset_2$ is the angle between the sloped surface 124 and the longitudinal axis of the upper jacket 110, and $F_s$ is the spring force from the spring 114.

Figure 7:
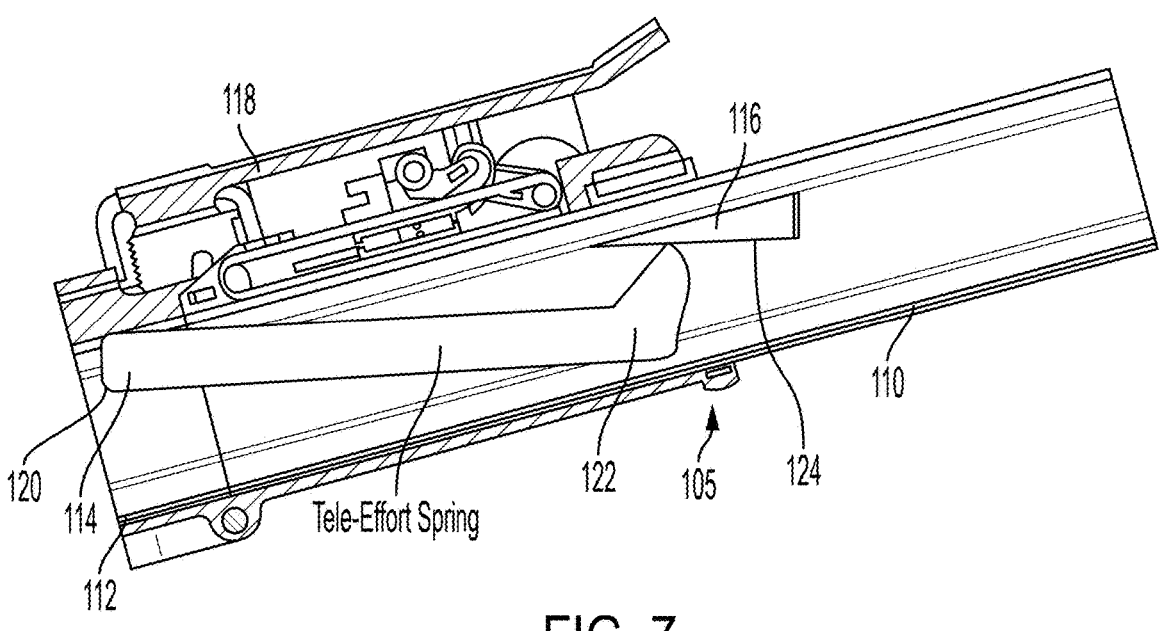
FIG. 7 is a side, cross-sectional view of the offsetting mechanism with the spring according to another aspect of the disclosure.
Figure 8:
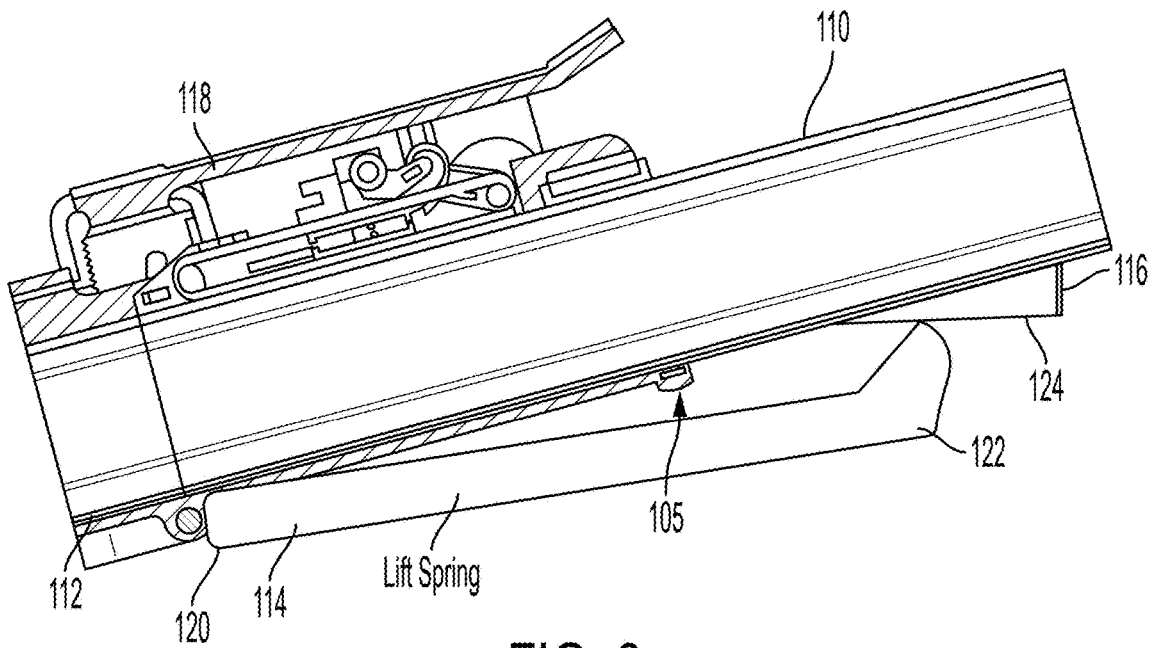
FIG. 8 is a side, cross-sectional view of the offsetting mechanism with the spring according to another aspect of the disclosure.

In an alternative embodiment, depicted in FIG. 7, the spring 114 is a telescope effort spring disposed within the upper jacket 110 and the lower jacket 112. The first end 120 of the spring 114 is attached within the lower jacket 112 and the second end 122 of the spring 114 slides on the sloped surface 124 when the upper jacket 110 telescopes in and telescopes out. In another alternative embodiment, depicted in FIG. 8, the spring 114 is a lift spring attached to the bottom of the lower jacket 112 at the first end 120, and slides on the sloped surface 124 at the second end 122. In this particular embodiment, the compensating component 116 may be integrally connected to the bottom of the upper jacket 110 or operatively connected to the bottom of the upper jacket 110.

In any of the embodiments disclosed herein, the sloped surface 124 may be a planar surface or may be curved to provide various desired force assist profiles. In particular, the entirety of the sloped surface 124 may be a single, common plane to form a fully flat surface 124. In other embodiment, the sloped surface 124 comprises two or more planar portions where their respective angles (Ø₂) may be different at each portion. For example, the angle (Ø₂) at one portion of the sloped surface 124 closer to the lower jacket 112 is larger (more steep) than another portion of the sloped surface 124 closer to the adaptor 108, or vice versa. In this embodiment, the angle (Ø₂) of the sloped surface 124 changes as the second end 122 of the spring 114 slides between the retracted column position to the extended column position. In yet another embodiment, at least a portion of the surface 124 is non-planar to provide a curved surface which changes the spring force applied at different contact locations of the spring 114 and the surface 124.

Various modifications and variations of the disclosure are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A steering column assembly comprising:
an upper jacket;
a lower jacket, wherein the upper jacket is telescopingly adjustable within the lower jacket between a retracted column position and an extended column position;
a hand wheel actuator disposed between an end of the upper jacket and a steering input device;
an offsetting mechanism comprising:
a spring extending from a first end to a second end; and
a compensation component, wherein the compensation component comprises a sloped surface disposed within an interior of the upper jacket, wherein the sloped surface is non-parallel with a longitudinal axis of the upper jacket, wherein the second end of the spring operably slides on the sloped surface of the compensation component during the telescopic adjustment, wherein the spring is configured to provide a biasing force at the second end of the spring that reduces gravitational effects on the steering column assembly during the telescopic adjustment.

2. The steering column assembly according to claim 1, wherein the biasing force is larger in the retracted column position than in the extended column position.

3. The steering column assembly according to claim 1, wherein the sloped surface of the compensation component is integrally formed with the upper jacket.

4. The steering column assembly according to claim 1, wherein the sloped surface of the compensation component is operatively coupled to the upper jacket.

5. The steering column assembly according to claim 1, wherein the sloped surface is angled at a predetermined angle from the upper jacket.

6. The steering column assembly according to claim 5, wherein the predetermined angle is based on an angle of the upper jacket in relation to a horizontal plane and weight of the steering column assembly.

7. The steering column assembly according to claim 1, wherein the spring is a rake spring.

8. The steering column assembly according to claim 1, further comprising an adaptor operatively coupled to the hand wheel actuator, the adaptor disposed between the hand wheel actuator and the upper jacket.

9. The steering column assembly according to claim 8, wherein the compensating component is integrally formed with the adaptor.

10. The steering column assembly according to claim 8, wherein the compensating component is operatively coupled to the adaptor.

11. The steering column assembly according to claim 1, wherein the sloped surface comprises two or more portions, each portion of the sloped surface has a different predetermined angle from the upper jacket.

12. The steering column assembly according to claim 1, wherein at least a portion of the sloped surface is non-planar.

13. A steering column assembly comprising:
an upper jacket;
a lower jacket, wherein the upper jacket is telescopingly adjustable within the lower jacket between a retracted column position and an extended column position;
a hand wheel actuator disposed between an end of the upper jacket and a steering input device;
an offsetting mechanism comprising:
a spring extending from a first end to a second end; and
a compensation component, wherein the compensation component comprises a sloped surface that is non-parallel with a longitudinal axis of the upper jacket, wherein the second end of the spring operably slides on the sloped surface of the compensation component during the telescopic adjustment, wherein the spring is configured to provide a biasing force at the second end of the spring that reduces gravitational effects on the steering column assembly during the telescopic adjustment.

* * * * *